Patented May 14, 1940

UNITED STATES PATENT OFFICE 2,201,121

UNSATURATED DERIVATIVES OF COMPOUNDS OF THE CYCLOPENTANO POLYHYDRO PHENANTHRENE SERIES AND A PROCESS OF PRODUCING THE SAME

Adolf Butenandt, Berlin - Lichterfelde, and Friedrich Hildebrandt, Hohen Neuendorf, near Berlin, Germany, assignors to Schering Corporation, Bloomfield, N. J., a corporation of New Jersey No Drawing. Application December 22, 1936, Serial No. 117,152. In Germany December 24, 1935

16 Claims. (Cl. 260—397)

This invention relates to unsaturated derivatives of compounds of the cyclopentano polyhydro phenanthrene series and particularly to such derivatives wherein the carbon atom 17 bearing a substituent is combined with the neighbouring carbon atom by a carbon to carbon double bond, and to a process of producing the same.

Our invention relates in particular to the production of unsaturated cyclopentano polyhydro phenanthrene compounds belonging to the oestrane and etiocholane types and having a carbon-to-carbon double bond at the 17-carbon. By "oestrane type" is to be understood those compounds whose ring A is aromatic in character, and in certain compounds also ring B, while the term "etiocholane type" embraces compounds in which all of the rings are partially or completely hydrogenated.

The process of the present invention consists in subjecting compounds of the cyclopentano polyhydro phenanthrene series which contain a tertiary hydroxyl group and a hydrocarbon substituent at the carbon atom 17 and a free hydrogen atom in the neighbourhood to the tertiary hydroxyl group present at the carbon atom 17, to a treatment suitable for splitting off water.

Such treatments are described, for instance, in Houben-Weyl, Methods of Organic Chemistry, 2nd vol., 2nd edition, Leipzig 1922, page 746 seq. Thus, the splitting off of water can be effected, for instance, by heating the starting material in a high vacuum, by boiling with acetic acid, by warming with metal salts, such as copper sulphate, stannous chloride or the like, usually in vacuum.

The cyclopentano polyhydro phenanthrene compounds which come into consideration as starting materials for the process of the present invention and which have the general structural formula.

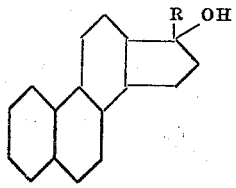

wherein for reason of lucidity only the atoms and the atom groups present at the carbon atom 17 are indicated, R representing any hydrocarbon radical, can be obtained, for instance, by causing suitable ketones of the cyclopentano polyhydro phenanthrene series, to react with metal organic compounds and hydrogenating, if desired, the products formed as is described, for instance, in the copending applications Serial No. 748,664 and Serial No. 8,842. As to the numeration of the carbon atoms, reference is had, for instance, to Fieser, "The Chemistry of Natural Products Related to Phenanthrene," New York 1936, page 111.

The carbon to carbon double bond formed in the reaction product by splitting off water according to the present invention may be situated between the carbon atoms 16 and 17 as indicated below, for instance, in the dehydration product II derived from the 17-methyl-dihydro follicle hormone I; the double bond may, however, also be situated between the carbon atoms 17 and 20 if the hydrocarbon radical present at the carbon atom 17 of the starting material renders possible or supports the splitting off of water in this direction, as is illustrated, for instance, by the following structural formulas representing 17-ethyl-androstendiol-3.17 (Formula III) and 17-isopropyl-androstandiol-3.17 (Formula V) and the corresponding dehydration products (Formula IV and Formula VI):

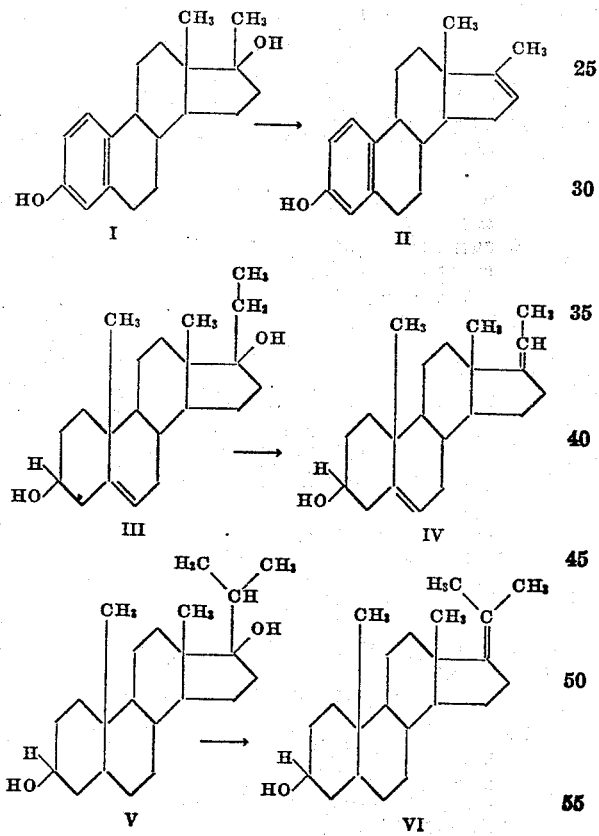

In the types of compounds represented by Formulas III and IV the nuclear double bond may be present also between the carbon atoms 4 and 5 instead of between 5 and 6.

If in the starting material besides the hydroxyl group situated at the carbon atom 17 one or more further hydroxyl groups are present, the latter can be transformed, if desired, by esterification, etherification or the like into the corresponding substituted compounds before carrying out the process of the present invention; in this manner the reaction products are obtained in the form of their substituted compounds used as starting materials, wherefrom the free unsaturated compounds can be obtained by hydrolysis. On the other hand, the reaction products obtained according to the process of the present invention that have a free hydroxyl group can be transformed into the corresponding substituted compounds by esterification, etherification or the like.

The following examples serve to illustrate the process of the present invention without, however, limiting the same to them:

*Example 1*

160 mg. 17-methyl dihydro follicle hormone of M. P. 185–187° C. are heated to boiling under reflux with 40 ccs. of glacial acetic acid for 5 hours. Thereupon the acetic acid is distilled off in vacuum and the residue sublimated in a high vacuum. The fraction distilling over at 115° C. is recrystallised from dilute methanol; the crystals obtained melt at 157–159° C., the results obtained in the carbon hydrogen determination correspond to the formula $C_{19}H_{24}O$.

*Example 2*

100 mg. 17-ethyl-androstenol-17-one-3, which can be obtained, for instance, from 17-ethyl-androstendiol-3.17-dibromide. By oxidation by means of chromic acid anhydride and dehalogenation by means of zinc dust in weakly mineral acidic alcohol, are distilled in high vacuum at 80–90° C. The oil present in the receiver after 24 hours is recrystallised from acetone whereby crystals in the form of well shaped long needles of the M. P. 135° C. are obtained, representing a keto group containing dehydration product of the formula $C_{21}H_{30}O$. By reaction with semicarbazide acetate in alcoholic solution a semicarbazone can be produced therefrom which shows after recrystallisation from alcohol a melting point of about 225° C. (with decomposition).

Of course, various other modifications in the procedure of the process of the present invention may be resorted to within the scope of the appended claims without departing from the principles set forth herein.

The unsaturated derivatives of compounds of the cyclopentano polyhydro phenanthrene series obtainable according to the process of the present invention are valuable products in physiological respect as they can, for instance, serve as intermediate products for the production of physiologically active compounds.

What we claim is:

1. Process of producing unsaturated derivatives of compounds of the cyclopentano polyhydro phenanthrene series comprising subjecting compounds of the cyclopentano polyhydro phenanthrene series which contain a tertiary hydroxyl group and a hydrocarbon substituent at the carbon atom 17 and a hydrogen atom attached to a carbon atom adjacent to the tertiary hydroxyl group present at the carbon atom 17, dehydrating conditions whereby the elements of water are split off from the substituents at the 17-carbon and the adjacent carbon.

2. Process according to claim 1 characterised in that 17-methyl dihydro follicle hormone is used as starting material.

3. Process according to claim 1 characterised in that 17-ethyl androstendiol-3.17 is used as starting material.

4. Process according to claim 1 characterised in that 17-ethyl androstenol-17-one-3 is used as starting material.

5. Process according to claim 1 characterised in that a hydroxyl group present in the starting material besides the tertiary hydroxyl group situated at the carbon atom 17 is converted into a group that, upon hydrolysis, can be reconverted into a hydroxyl group.

6. Process according to claim 1 characterised in that a hydroxyl group present in the starting material besides the tertiary hydroxyl group situated at the carbon atom 17 is converted into a group that, upon hydrolysis, can be reconverted into a hydroxyl group, and hydrolyzing the reaction product to restore the hydroxyl group.

7. Process according to claim 1 characterised in that a hydroxyl group present in the reaction product is converted into a group that, upon hydrolysis, can be reconverted into a hydroxyl group.

8. Unsaturated compounds of the 13-methyl and of the 10,13-dimethyl cyclopentano polyhydro phenanthrene series having a carbon-to-carbon double bond between the carbon atoms 17 and an adjacent carbon which does not form part of the phenanthrene nucleus.

9. Unsaturated compounds of the cyclopentano polyhydro phenanthrene series belonging to the etiocholane types and having the following structural formula

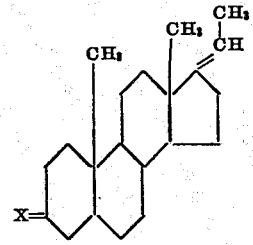

wherein X represents a member of the group consisting of oxygen and an

and R indicating a member of the class composed of the hydroxyl group and groups that, upon hydrolysis, can be replaced by a hydroxyl group.

10. Unsaturated compounds of the cyclopentano polyhydro penanthrene series belonging to the etiocholane types and having the following structural formula

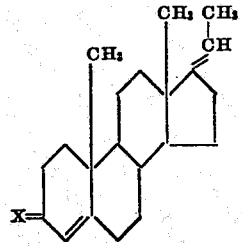

wherein X represents a member of the group consisting of oxygen and an

and R indicating a member of the class composed of the hydroxyl group and groups that, upon hydrolysis, can be replaced by a hydroxyl group.

11. Unsaturated compounds of the cyclopentano polyhydro phenanthrene series belonging to the etiocholane types and having the following structural formula

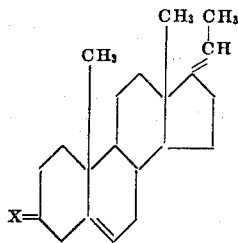

wherein X represents a member of the group consisting of oxygen and an

and R indicating a member of the class composed of the hydroxyl group and groups that, upon hydrolysis, can be replaced by a hydroxyl group.

12. An unsaturated compound of the cyclopentano polyhydro phenanthrene series containing a keto group and having the general formula $C_{21}H_{30}O$ corresponding to the structural formula

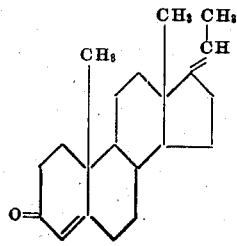

said compound crystallising in the form of well-shaped long needles of the melting point 135° C., its semi-carbazone melting at about 225° C. (with decomposition).

13. Process for producing unsaturated derivatives of compounds of the cyclopentano polyhydro phenanthrene series, comprising heating compounds of the cyclopentano polyhydro phenanthrene series, which contain a tertiary hydroxyl group and a hydrocarbon substituent at the carbon atom 17, and a hydrogen atom attached to a carbon atom adjacent to the tertiary hydroxyl group present at the carbon atom 17, under a high vacuum, until the elements of water are split off from the substituents at the 17-carbon and the adjacent carbon.

14. Unsaturated compounds of the 13-methyl and of the 10,13-dimethyl cyclopentano polyhydro phenanthrene series having a hydrocarbon radical connected to the carbon atom 17 by way of a double bond.

15. Process for producing unsaturated derivatives of compounds of the cyclopentano polyhydro phenanthrene series, comprising heating compounds of the cyclopentano polyhydro phenanthrene series, which contain a tertiary hydroxyl group and a hydrocarbon substituent at the carbon atom 17, and a hydrogen atom attached to a carbon atom adjacent to the tertiary hydroxyl group present at the carbon atom 17, in the presence of a dehydrating agent, until the elements of water are split off from the substituents at the 17-carbon and the adjacent carbon.

16. Process for producing unsaturated derivatives of compounds of the cyclopentano polyhydro phenanthrene series, comprising heating compounds of the cyclopentano polyhydro phenanthrene series, which contain a tertiary hydroxyl group and a hydrocarbon substituent at the carbon atom 17, and a hydrogen atom attached to a carbon atom adjacent to the tertiary hydroxyl group present at the carbon atom 17, in the presence of acetic acid until the elements of water are split off from the substituents at the 17-carbon and the adjacent carbon.

ADOLF BUTENANDT.
FRIEDRICH HILDEBRANDT.